(12) United States Patent
Kim (10) Patent No.: US 7,809,379 B2
(45) Date of Patent: Oct. 5, 2010

(54) MULTI-MODE MOBILE TERMINAL AND METHOD OF TRIGGERING COMMUNICATION SERVICE USING POSITION INFORMATION THEREOF

(75) Inventor: Tai Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/154,823

(22) Filed: Jun. 17, 2005

(65) Prior Publication Data

US 2005/0282579 A1      Dec. 22, 2005

(30) Foreign Application Priority Data

Jun. 21, 2004    (KR) ...................... 10-2004-0046032

(51) Int. Cl.
*H04W 24/00* (2009.01)
(52) U.S. Cl. .............. 455/456.3; 455/414.1; 455/432.1; 455/432.3; 455/436; 455/446; 455/452.2; 455/456.1; 455/457; 455/181.1; 455/440; 455/437; 455/438; 455/439; 455/441; 455/442; 455/443; 370/395.4; 370/395.42; 370/395.43
(58) Field of Classification Search .............. 455/414.1, 455/432.1, 432.3, 436–443, 446, 452.2, 456.1, 455/456.3, 457, 181.1; 370/395.4, 395.42, 370/395.43
See application file for complete search history.

(56) References Cited

U.S. PATENT DOCUMENTS 5,974,328 A * 10/1999 Lee et al. .................. 455/456.3

(Continued)

FOREIGN PATENT DOCUMENTS

JP            11-252619            9/1999

(Continued)

OTHER PUBLICATIONS

English Language Abstract of W.O. 01/045446.

(Continued)

*Primary Examiner*—Patrick N Edouard
*Assistant Examiner*—Shantell Heiber
(74) *Attorney, Agent, or Firm*—Birch, Stewart, Kolasch & Birch, LLP (57) ABSTRACT

The present invention provides a multi-mode mobile terminal and method of triggering a communication service using position information thereof, by which the multi-mode mobile terminal triggers its optimal communication service in a communication environment where various kinds of communications systems co-exist. The present invention includes acquiring a position of a multi-mode mobile terminal configured to operate in a plurality of separate communication modes and operating the multi-mode mobile terminal in the communication mode based on its position.

4 Claims, 8 Drawing Sheets

U.S. PATENT DOCUMENTS

| | | | |
|---|---|---|---|
| 6,208,857 B1 * | 3/2001 | Agre et al. | 455/428 |
| 6,397,072 B1 * | 5/2002 | Peters et al. | 455/456.3 |
| 6,748,217 B1 * | 6/2004 | Hunzinger et al. | 455/435.2 |
| 6,954,649 B2 * | 10/2005 | Kotzin | 455/456.1 |
| 2002/0068608 A1 | 6/2002 | Souissi | |
| 2003/0211862 A1 * | 11/2003 | Hutchison et al. | 455/552.1 |
| 2004/0116132 A1 | 6/2004 | Hunzinger et al. | |
| 2005/0083899 A1 * | 4/2005 | Babbar et al. | 370/342 |
| 2005/0250496 A1 * | 11/2005 | Hason et al. | 455/436 |

FOREIGN PATENT DOCUMENTS

| | | |
|---|---|---|
| JP | 2001-78242 | 3/2001 |
| JP | 2001-119753 | 4/2001 |
| JP | 2002-152808 | 5/2002 |
| JP | 2004-140459 | 5/2004 |
| WO | WO 01/045446 | 6/2001 |
| WO | WO 01/050788 | 7/2001 |
| WO | WO 01/062034 | 8/2001 |
| WO | WO 03/067918 | 8/2003 |
| WO | WO 03/096727 | 11/2003 |
| WO | WO 03/100647 | 12/2003 |
| WO | WO 03/101138 | 12/2003 |
| WO | WO-2004-040931 | 5/2004 |

OTHER PUBLICATIONS

English language Abstract of JP 2001-119753.
English language Abstract of JP 2004-140459, May 13, 2004.
English language Abstract of JP 11-252619, Sep. 17, 1999.
English language Abstract of JP 2001-78242, Mar. 23, 2001.
English language Abstract of JP 2002-152808, May 24, 2002.

* cited by examiner

| Position index | Communication mode | Coordinates range |
|---|---|---|
| 1 | CDMA | (x: $A_1 \sim A_2$, y: $B_1 \sim B_2$) |
| 2 | CDMA | (x: $A_2 \sim A_3$, y: $B_1 \sim B_2$) |
| 3 | CDMA | (x: $A_3 \sim A_4$, y: $B_1 \sim B_2$) |
| 4 | GSM | (x: $A_1 \sim A_2$, y: $B_2 \sim B_3$) |
| 5 | GSM | (x: $A_2 \sim A_3$, y: $B_2 \sim B_3$) |
| 6 | CDMA | (x: $A_3 \sim A_4$, y: $B_2 \sim B_3$) |
| ⋮ | ⋮ | ⋮ |

MULTI-MODE MOBILE TERMINAL AND METHOD OF TRIGGERING COMMUNICATION SERVICE USING POSITION INFORMATION THEREOF

This application claims the benefit of the Korean Application No. 10-2004-0046032 filed on Jun. 21, 2004, which is hereby incorporated by reference in its entirety.

BACKGROUND OF THE INVENTION

1. Field of the Invention

The present invention relates to a mobile communications system, and more particularly, to a multi-mode mobile terminal and method of triggering a communication service using position information thereof, by which a communication mode can be triggered to support a plurality of communication services.

2. Discussion of the Related Art

Generally, in the currently established communication environment, not only one communication system but also various kinds of communication systems exist together, which means the various kinds of separate communication services are provided in the communication environment.

For instance, both of the code division multiple access (hereinafter abbreviated CDMA) communication service and the global system for mobile communication (hereinafter abbreviated GSM) service may be provided within a wide area.

For another instance, both of the CDMA communication service and the wideband code division multiple access (hereinafter abbreviated W-CDMA) communication service are provided together.

Thus, a multi-mode mobile terminal has been developed to fit the communication environment where various kinds of communications systems co-exist.

The multi-mode mobile terminal enables to utilize frequency bandwidths corresponding to a plurality of separate communication modes, respectively, thereby being equipped with a roaming function of switching from a communication mode supported by a specific communication system to another communication mode supported by another communication system.

Moreover, the multi-mode mobile terminal adopts an automatic triggering type and/or a manual triggering type in switching a communication mode for roaming.

The automatic triggering type multi-mode mobile terminal triggers its service (communication) method by itself according to presence or non-presence of reception of base station signals. The base station signals that will be explained in the following include electromagnetic wave strength, communication parameters, intrinsic identification (ID) of the base station, etc.

On the other hand, the manual triggering type multi-mode mobile terminal triggers its service (communication) method by a user's direct manipulation.

These two kinds of triggering methods are explained in detail in the following by taking a multi-mode mobile terminal enabling to utilize both CDMA and GSM communications systems as an example.

Figure 1:
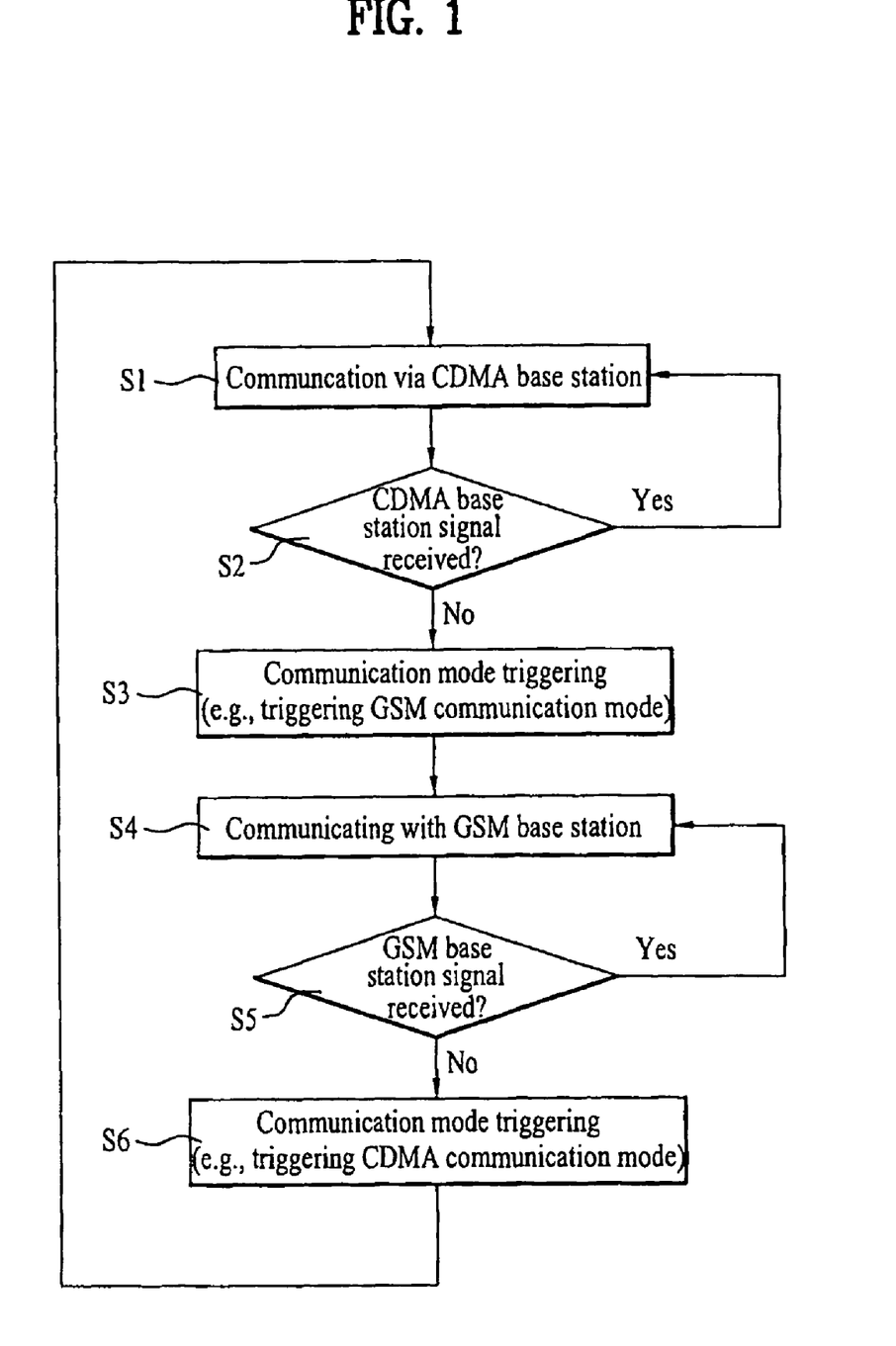
FIG. 1 is a flowchart of an automatic triggering method of a communication service according to a related art.

FIG. 1 is a flowchart of an automatic triggering method of a communication service according to a related art.

Referring to FIG. 1, it is assumed that a multi-mode mobile terminal operates in a CDMA communication mode communicating with a CDMA base station (S1).

The multi-mode mobile terminal keeps checking whether a signal is received from the CDMA base station (S2).

Once receiving the signal from the CDMA base station, the multi-mode mobile terminal maintains the CDMA communication mode communicating with the CDMA base station.

Yet, if failing to receive the signal from the CDMA base station, the multi-mode mobile terminal triggers its communication mode (S3). Namely, the multi-mode mobile terminal switches the current communication mode to a GSM communication mode if not receiving a CDMA signal.

The multi-mode mobile terminal communicates with a GSM base station, accordingly (S4).

Thereafter, the multi-mode mobile terminal keeps checking whether a signal is received from the GSM base station (S5).

Once receiving the signal from the GSM base station, the multi-mode mobile terminal maintains the GSM communication mode communicating with the GSM base station.

Yet, if failing to receive the signal from the GSM base station, the multi-mode mobile terminal triggers its communication mode (S6). Namely, the multi-mode mobile terminal switches the current communication mode to the CDMA communication mode if not receiving a CDMA signal.

And, the multi-mode mobile terminal communicates with the CDMA base station (S1), accordingly.

Figure 2:
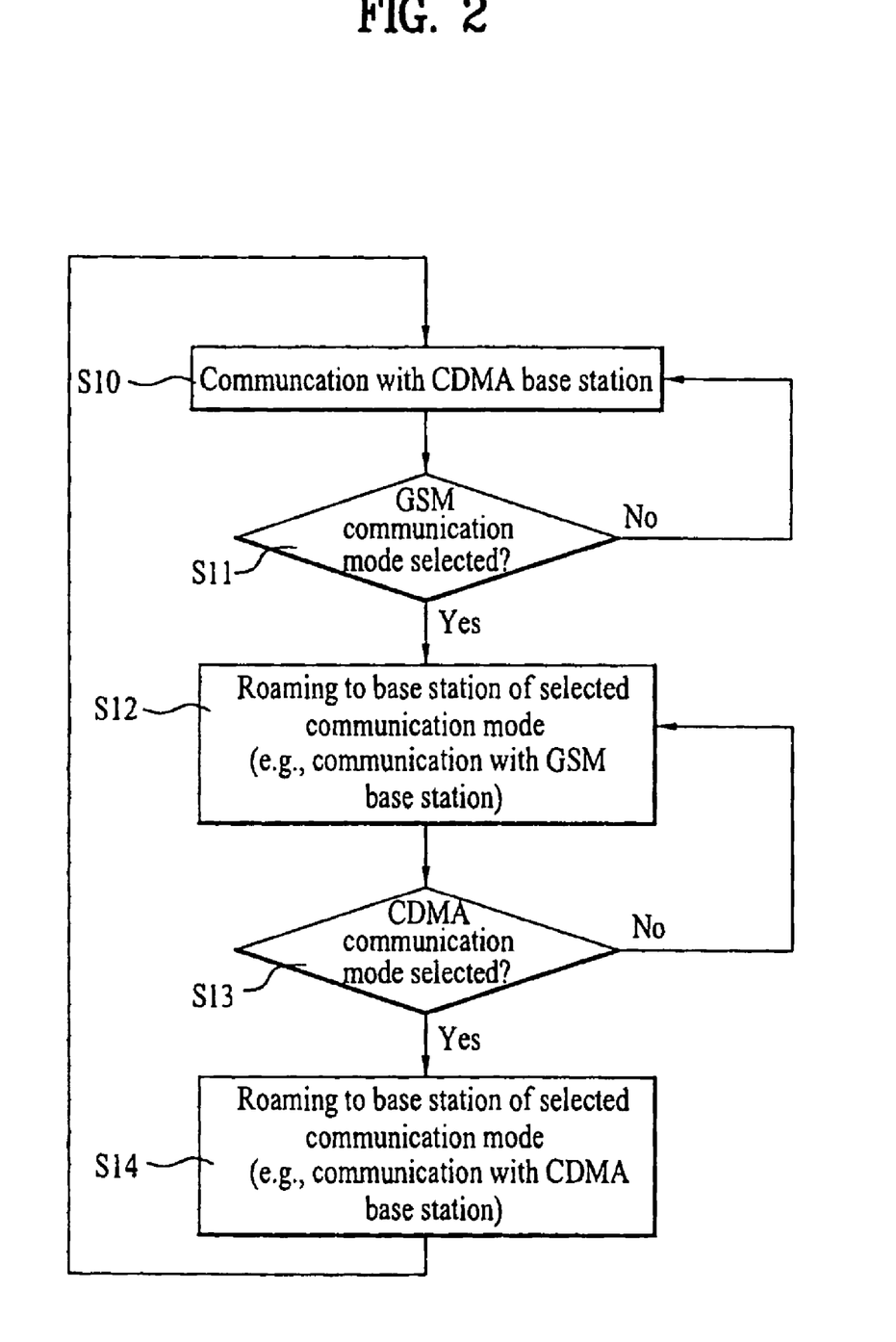
FIG. 2 is a flowchart of a manual triggering method of a communication service according to a related art.

FIG. 2 is a flowchart of a manual triggering method of a communication service according to a related art.

Referring to FIG. 2, it is assumed that a multi-mode mobile terminal operates in CDMA communication mode communicating with a CDMA base station (S10).

Moreover, it is also assumed that a user of the multi-mode mobile terminal has moved away into another area and that the user already knew a communication mode of the area where he has moved. For example, the user carrying the multi-mode mobile terminal operating in the CDMA communication mode has moved away into B-area from A-area and the user already recognized that the communication mode in the B-area is GSM.

The user should manually manipulate the multi-mode mobile terminal to select the communication mode of the B-area where he has moved.

The multi-mode mobile terminal confirms presence or non-presence of user's selection of the communication mode (S11). The multi-mode mobile terminal confirms the presence or non-presence of the user's selection of the GSM communication mode since the CDMA communication mode is currently used.

If the user selects the communication mode of the B-area, the multi-mode mobile terminal operates in the communication mode selected by the user.

Once the user having moved to the B-area, as explained in the above-example, selects the GSM communication mode, the multi-mode mobile terminal operates in the GSM communication mode to communicate with the GSM base station.

In brief, the multi-mode mobile terminal roams to the GSM base station supporting the GSM communication mode selected by the user (S12).

Thereafter, the user should select the communication mode by manually manipulating the multi-mode mobile terminal.

The multi-mode mobile terminal checks presence or non-presence of user's selection of the communication mode (S13). The multi-mode mobile terminal confirms the presence or non-presence of the user's selection of the CDMA communication mode since it is currently roamed to the GSM communication mode.

If the user selects another communication mode, the multi-mode mobile terminal operates in the communication mode selected by the user.

Once the user having moved to the B-area, as explained in the above-example, returns to the A-area to select the CDMA communication mode, the multi-mode mobile terminal operates in the CDMA communication mode to communicate with the CDMA base station.

In brief, the multi-mode mobile terminal roams to the CDMA base station supporting the CDMA communication mode selected by the user (S14).

As explained in the above description, the multi-mode mobile terminal triggers the communication mode enabling to receive the base station signal in selecting the communication mode for roaming.

The multi-mode mobile terminal generally uses the automatic triggering method together with the manual triggering method. Namely, the multi-mode mobile terminal holds user's communication mode selection as well as automatically triggers the communication mode according to the presence or non-presence of the reception of the base station signal.

However, if the related art multi-mode mobile terminal is located in a place of poor reception of the base station signal such as a basement and a shadow zone. It has a problem in repeating the communication mode triggering to select one of supportable communication modes. This is because the multi-mode mobile terminal adopts the automatic triggering method.

For instance, if the related art multi-mode mobile terminal is operative in CDMA communication mode, W-CDMA communication mode, or GSM communication mode, it automatically triggers the CDMA communication mode on receiving CDMA base station signal, the W-CDMA communication mode on receiving W-CDMA base station signal, or the GSM communication mode on receiving GSM base station signal.

Yet, when the multi-mode mobile terminal is located in the area enabling both receptions of the CDMA and GSM base station signals, the communication mode triggering frequently takes place in the multi-mode mobile terminal unnecessarily. This considerably stands in the way of user's communications.

Although one specific communication mode manually selected by a user is intended to maintain, if temporary failure is caused to the multi-mode mobile terminal so that the multi-mode mobile terminal is unable to receive a base station signal in a currently set communication mode, the current communication mode is automatically switched to another communication mode to receive base station signals in another communication mode. This behavior confuses the user's communication mode selection and may make the user unable to recognize what is the current mode.

Meanwhile, in case that the related art multi-mode mobile terminal adopts the manual triggering method, the user may select a wrong communication mode. Namely, a user of a multi-mode mobile terminal is unable to know the exact communication mode fitting each area. For that reason, the user intends to maintain the previously selected communication mode despite his wrong selection of the communication mode for the currently located area once the communication mode is selected, thereby failing to be supported by the most appropriate communication mode to be unable to smoothly communicate. Keeping operating in the currently selected communication mode, the multi-mode mobile terminal may be unable to receive the corresponding base station signals and its communication may be cut off.

For instance, let us assume that a multi-mode mobile terminal operating in GSM communication mode has moved to an area governed by the CDMA communication mode. If a user fails to recognize that the current area is governed by the CDMA communication mode, the multi-mode mobile terminal keeps trying to receive GSM base station signals impossible to receive. Consequently, it is impossible for the multi-mode mobile terminal to communicate in the current area governed by the CDMA communication mode.

SUMMARY OF THE INVENTION

Accordingly, the present invention is directed to a multi-mode mobile terminal and method of triggering a communication service using position information thereof that substantially obviate one or more problems due to limitations and disadvantages of the related art.

An object of the present invention is to provide a multi-mode mobile terminal and method of triggering a communication service using position information thereof, by which the multi-mode mobile terminal triggers its optimal communication service in a communication environment where various kinds of communications systems co-exist.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication service triggering method using position information according to the present invention includes acquiring a position of a multi-mode mobile terminal configured to operate in a plurality of separate communication modes and operating the multi-mode mobile terminal in a communication mode based on its position.

Preferably, the communication service triggering method further includes setting a preferential communication mode for each of a plurality of areas. In this case, the multi-mode mobile terminal selects a preferential communication mode corresponding to the acquired position, and the multi-mode mobile terminal is operated in the selected preferential communication mode. Further, the multi-mode mobile terminal switches a current communication mode to the selected preferential communication mode if the current communication mode of the multi-mode mobile terminal is different than the selected preferential communication mode.

Preferably, the multi-mode mobile terminal switches a currently operating communication mode to a communication mode based on the position of the multi-mode terminal, after which the multi-mode terminal is prevented from switching communication modes again for a predetermined amount of time.

Preferably, the multi-mode mobile terminal receives information corresponding to its position from a global positioning system (GPS) satellite.

Instead, the multi-mode mobile terminal may compute information corresponding to its position using at least one of strength of a reception signal, time of arrival (TOA) of the reception signal, time difference of arrival (TDOA) between reception signals, and angle of arrival (AOA) of the reception signal.

In another aspect of the present invention, a communication service triggering method using position information includes storing information correlating position information with preferential communication modes in a database of a multi-mode mobile terminal configured to operate in a plurality of separate communication modes, acquiring a position of the multi-mode mobile terminal, selecting a preferential communication mode corresponding to the acquired position from the database, and triggering the selected preferential communication mode in the multi-mode mobile terminal.

Preferably, the multi-mode mobile terminal communicates with a base station supporting the triggered communication mode.

In another aspect of the present invention, a multi-mode mobile terminal includes a database that stores information correlating position information with preferential communication modes, a transceiver unit for transmitting and receiving signals, and a host processor that controls operations of the transceiver unit based upon the information in the database.

Preferably, the multi-mode mobile terminal further includes a position information receiving circuit for receiving position information from a global positioning system (GPS) satellite to acquire a position of the multi-mode mobile terminal.

Preferably, the host processor calculates a position of the multi-mode mobile terminal using at least one of strength of a reception signal received via the transceiver unit, time of arrival (TOA) of the reception signal, time difference of arrival (TDOA) between reception signals, and angle of arrival (AOA) of the reception signal.

Preferably, the host processor acquires the position of the multi-mode mobile terminal and then searches the database for a preferential communication mode corresponding to the acquired position. More preferably, the host processor controls the transceiver unit to operate in the preferential communication mode.

Preferably, the transceiver unit includes a plurality of transceiver circuits, and each transceiver circuit is configured to operate in a different communication mode. In this case, the host processor acquires the position of the multi-mode mobile terminal and then searches the database for a preferential communication mode corresponding to the acquired position. Further, the host processor selects a transceiver circuit configured to operate in the preferential communication mode corresponding to the acquired position. In this case, the host processor stops the operation of a currently operating transceiver circuits and starts the operation of the transceiver circuit configured to operate in the preferential communication mode corresponding to the acquired position, if the currently operating transceiver circuit is not configured to operate in the preferential communication mode corresponding to the acquired position.

Preferably, the host processor controls the transceiver unit to switch to the preferential communication mode corresponding to the acquired position if the multi-mode mobile terminal is not currently operating in the preferential communication mode corresponding to the acquired position. Preferably, the multi-mode terminal includes a timer that initiates upon switching the transceiver unit to the preferential communication mode. In this case, the transceiver unit is prevented from switching communication modes within a predetermined amount of time from the initiation of the timer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a mobile terminal of the present invention is a multi-mode mobile terminal.

And, the multi-mode mobile terminal acquires its position using the following three kinds of methods. Yet, the position acquiring method of the multi-mode mobile terminal of the present invention is not limited to the following three kinds of methods.

Firstly, the multi-mode mobile terminal receives position information from a global positioning system (GPS) satellite and then acquires its current location from the received position information. And, a position information receiver is built in the multi-mode mobile terminal according to the present invention.

Secondly, the multi-mode mobile terminal acquires its location by itself. In doing so, the multi-mode mobile terminal computes its location using parameters such as strength of a reception signal, time of arrival (TOA) of the reception signal, time difference of arrival between reception signals, angle of arrival (AOA) of the reception signal, and the like.

Thirdly, the multi-mode mobile terminal receives position information from GPS satellite to acquire its current location or computes its location using various parameters of reception signals in case of being located at a place where it is unable to receive the position information from the GPS satellite. Namely, the multi-mode mobile terminal carries out the above-explained first and second methods side by side to acquire its location.

Figure 3A:
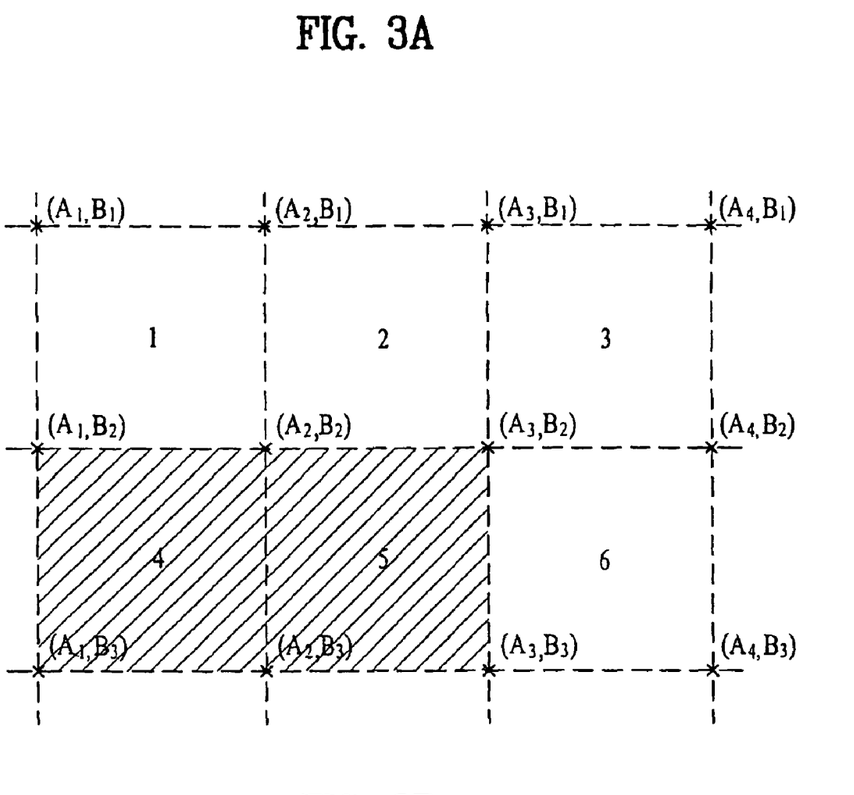
FIG. 3A is an exemplary diagram of a position index setup according to position coordinates according to the present invention.
Figure 3B:
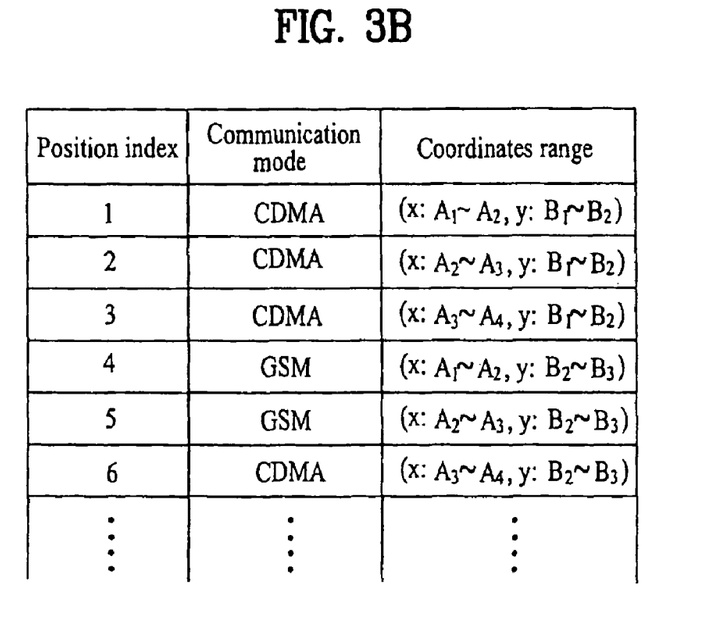
FIG. 3B is an exemplary table of established communication mode database using the position index of FIG. 3A.

FIG. 3A is an exemplary diagram of a position index setup according to position coordinates according to the present invention, and FIG. 3B is an exemplary table of established communication mode database using the position index of FIG. 3A.

Referring to FIG. 3A and FIG. 3B, an environment where various kinds of communications are mixed to co-exist, i.e., an area provided with various kinds of separate communication services is identified by coordinates shown in FIG. 3A.

One position index is set up for each area identified by the coordinates and a preferential communication mode is set up per position index. In doing so, the communication mode set up per position index is decided by a multitude of experiments and a communication mode of a specific position index is modified according to a communication environment. And, even if the preferential communication mode is set up for the area corresponding to the one position index, an inferior communication mode supports the area corresponding to the one position index as well.

For instance, it is assumed that communication areas corresponding to position index '1' to position index '6' in FIG. 3A are supported by both CDMA and GSM communication modes. If the CDMA communication mode is superior to the GSM communication mode in quality within the area corresponding to the position index '1', a communication mode of the position index '1' is set to 'CDMA'. If the GSM communication mode is superior to the CDMA communication mode in quality within the area corresponding to the position index '4', a communication mode of the position index '4' is set to 'GSM'.

Meanwhile, FIG. 3A exemplarily shows one area is identified by four coordinates. Yet, it is also possible to set up one area to be identified by three coordinates or a plurality of coordinates.

And, a multi-mode mobile terminal possesses information shown in FIG. 3B as database.

Hence, grasping its location or position, the multi-mode mobile terminal recognizes a range of its coordinates and then acquires a communication mode of the position index corresponding to the coordinate range via the database. Accordingly, a current communication mode of the multi-mode mobile terminal is manually or automatically switched if necessary. For example, the current communication mode is switched if the communication mode currently used by the multi-mode mobile terminal is different from the communication mode acquired according to its current location.

Various examples for a process that a multi-mode mobile terminal triggers its communication mode using current position information are explained as follows based on FIG. 3A and FIG. 3B.

Figure 4:
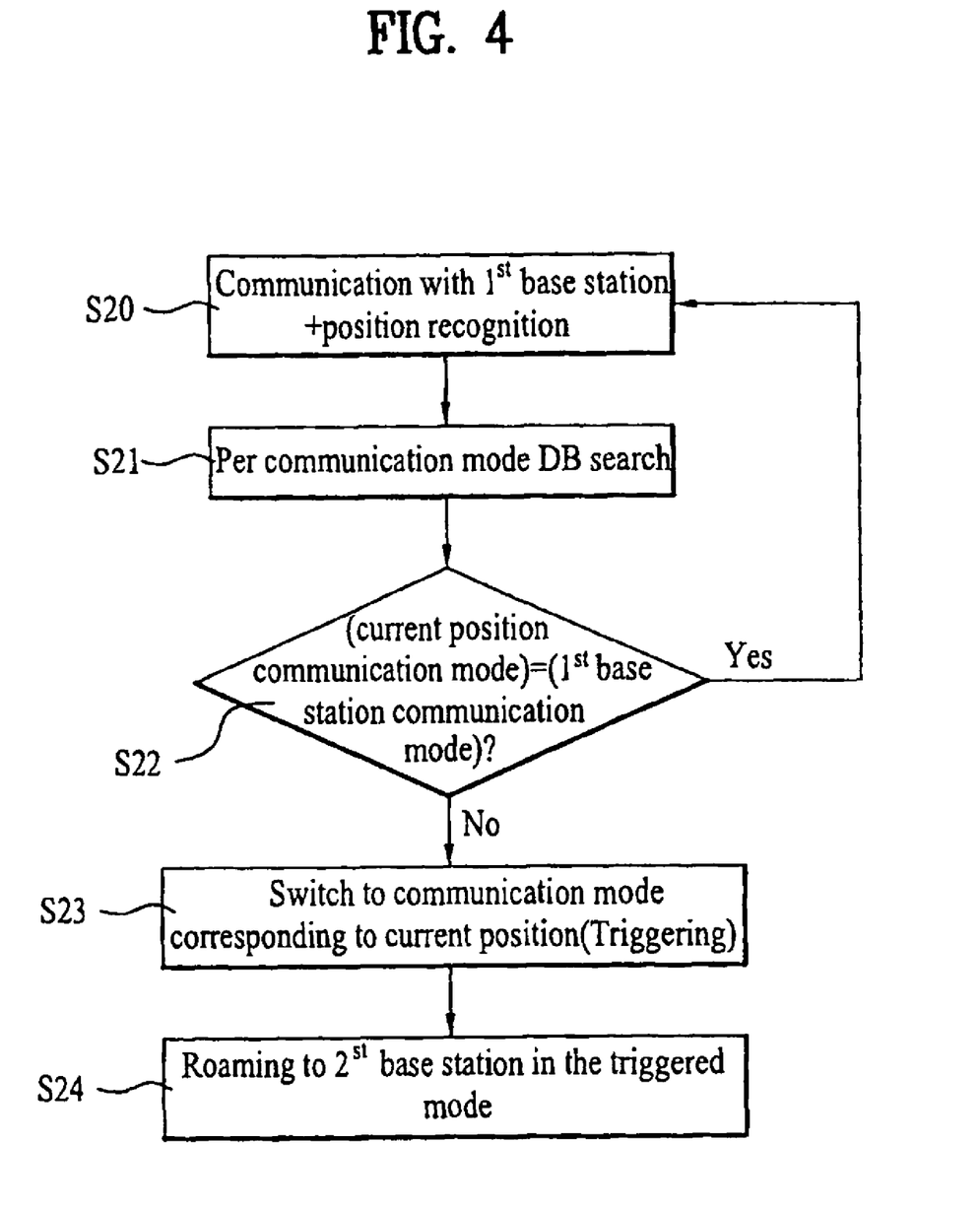
FIG. 4 is a flowchart of a triggering process of communication mode using position information according to a first embodiment of the present invention.

FIG. 4 is a flowchart of a method of triggering a communication mode using position information according to a first embodiment of the present invention, in which automatic triggering of a communication service is shown.

Referring to FIG. 4, it is assumed that a current multi-mode mobile terminal is communicating with a first base station. In doing so, the multi-mode mobile terminal acquires its current position (S20). The position acquirement is available in case of receiving position information from a GPS satellite or using various parameters of reception signals. Such an operation is already explained in the foregoing description and is identically applied to the embodiments shown in FIGS. 5 to 7. Hence, the position acquirement of the multi-mode mobile terminal is no more explained in FIGS. 5 to 7.

The multi-mode mobile terminal looks for a preferential communication mode in its currently acquired position. Namely, the multi-mode mobile terminal searches a database storing setup information of communication mode per position using its currently acquired position (S21).

In doing so, the multi-mode mobile terminal compares the communication mode searched via the database, i.e., communication mode corresponding to its position, to a communication mode of the first base station to find out whether the former coincides with the latter (S22). In this case, the communication mode of the first base station is identical to the communication mode the multi-mode mobile terminal is using.

If the communication mode searched via the database fails to coincide with the communication mode of the first base station, the multi-mode mobile terminal triggers the communication mode corresponding to its current position (communication mode searched via database) from the currently used communication mode (S23).

And, the multi-mode mobile terminal roams into a second base station supporting the triggered communication mode (S24). Namely, the multi-mode mobile terminal terminates its communications with the first base station and initiates to communicate with the second base station supporting the triggered communication mode.

On the other hand, if the communication mode searched via the database coincides with that of the first base station, the multi-mode mobile terminal keeps communicating with the first base station and operating to acquire its position.

Figure 5:
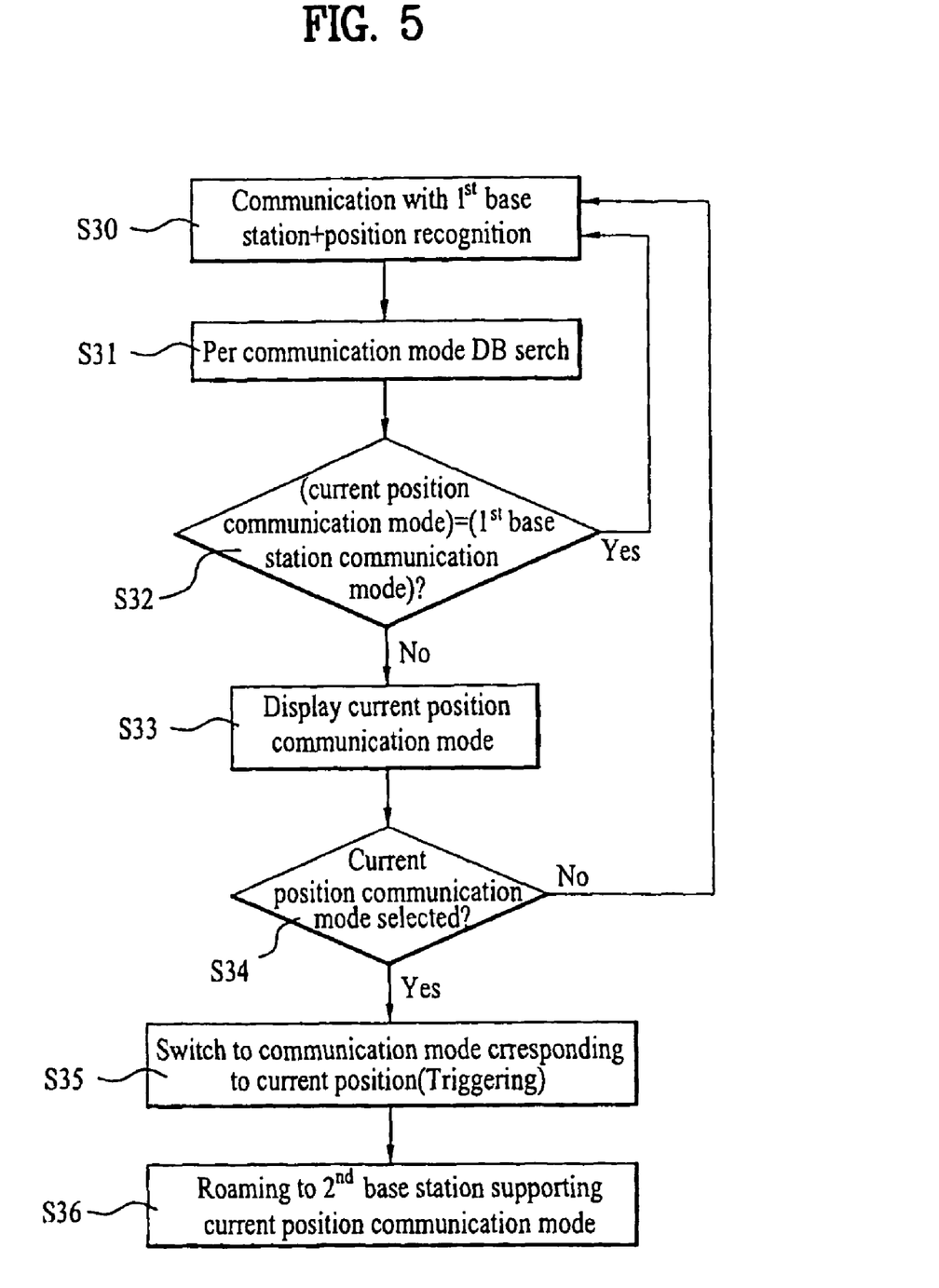
FIG. 5 is a flowchart of a triggering process of communication mode using position information according to a second embodiment of the present invention.

FIG. 5 is a flowchart of a method of triggering a communication mode using position information according to a second embodiment of the present invention, in which manual triggering of a communication service is shown.

Referring to FIG. 5, it is assumed that a current multi-mode mobile terminal is communicating with a first base station. In doing so, the multi-mode mobile terminal acquires its current position (S30).

The multi-mode mobile terminal looks for a preferential communication mode in its currently acquired position. Namely, the multi-mode mobile terminal searches a database storing setup information of communication mode per position using its currently acquired position (S31).

In doing so, the multi-mode mobile terminal compares the communication mode searched via the database, i.e., communication mode corresponding to its position, to a communication mode of the first base station to find out whether the former coincides with the latter (S32). In this case, the communication mode of the first base station is identical to the communication mode the multi-mode mobile terminal is using.

If the communication mode searched via the database fails to coincide with the communication mode of the first base station, the multi-mode mobile terminal displays the communication mode corresponding to its current position (communication mode searched via database) on a window (S33).

And, the multi-mode mobile terminal checks whether a user selects the communication mode searched via the database (S34).

If the user selects a communication mode corresponding to his position (communication mode searched via the database), the multi-mode mobile terminal triggers the communication mode selected by the user (communication mode corresponding to his position, i.e., communication mode searched via the database) from the currently used communication mode (S35).

And, the multi-mode mobile terminal roams into a second base station supporting the triggered communication mode (S36). Namely, the multi-mode mobile terminal terminates its communications with the first base station and initiates to communicate with the second base station supporting the triggered communication mode.

On the other hand, if the user does not select the communication mode corresponding to his position (communication mode searched via the database), the multi-mode mobile terminal keeps communicating with the first base station and operating to acquire its position.

Figure 6:
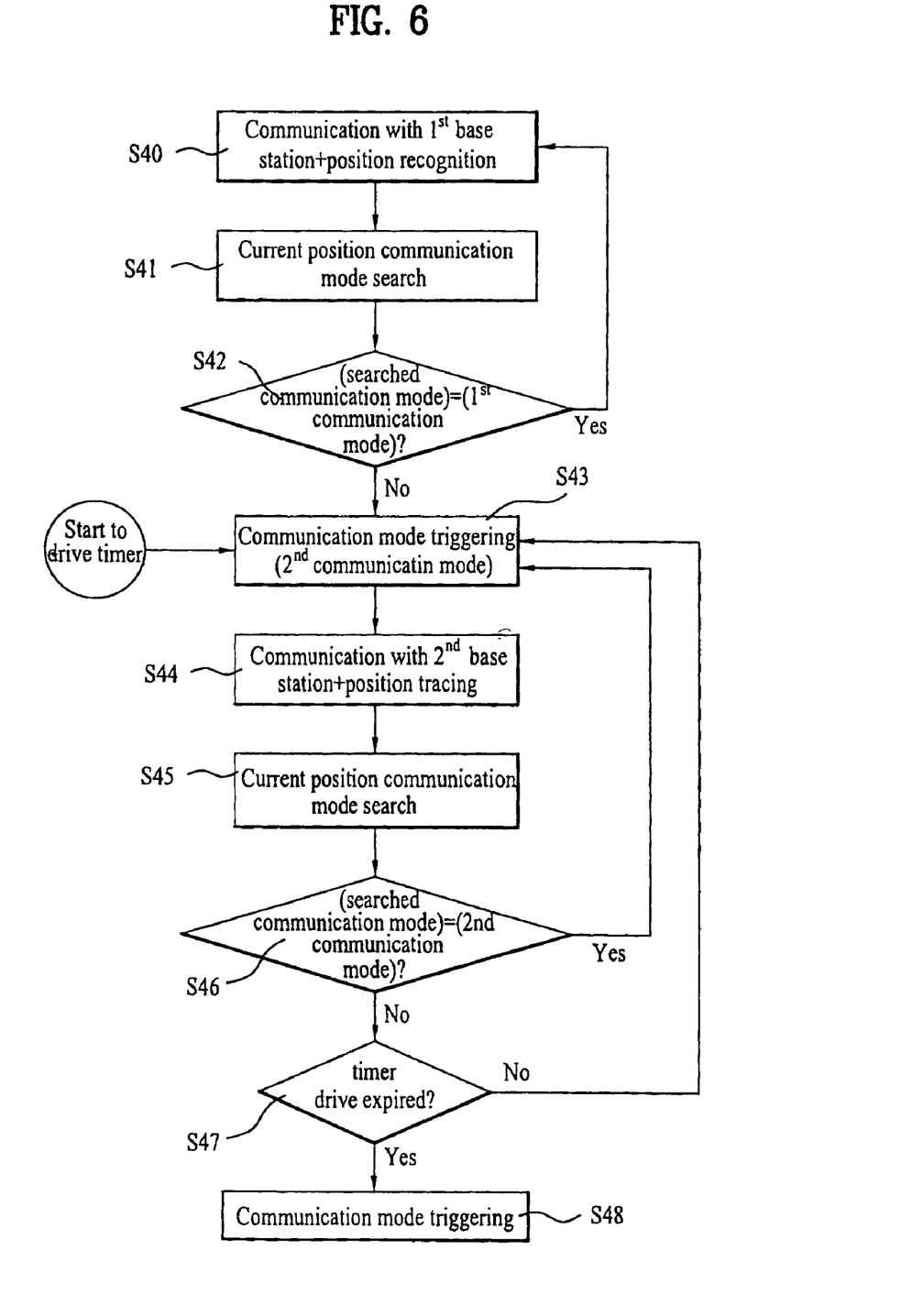
FIG. 6 is a flowchart of a triggering process of communication mode using position information according to a third embodiment of the present invention.

FIG. 6 is a flowchart of a method of triggering a communication mode using position information according to a third embodiment of the present invention, in which automatic triggering of a communication service using a timer is shown.

Referring to FIG. 6, it is assumed that a current multi-mode mobile terminal is communicating with a first base station supporting a first communication mode. In doing so, the multi-mode mobile terminal traces its current position (S40).

The multi-mode mobile terminal looks for a preferential communication mode in its currently traced position. Namely, the multi-mode mobile terminal searches a database storing setup information of communication mode per position using its currently traced position (S41).

In doing so, the multi-mode mobile terminal compares the communication mode searched via the database, i.e., communication mode corresponding to its traced position, to the first communication mode to find out whether the former coincides with the latter (S42). In this case, the first communication mode is identical to the communication mode the multi-mode mobile terminal is using.

If the communication mode searched via the database fails to coincide with the first communication mode, the multi-mode mobile terminal triggers the communication mode corresponding to its current traced position (communication mode searched via database) from the currently used communication mode (S43). At the time point of triggering the communication mode, a timer of the present invention starts to operate.

And, the multi-mode mobile terminal roams into a second base station supporting the triggered communication mode to communicate with the second base station. And the multi-mode mobile terminal keeps tracing its position (S44).

On the other hand, if the communication mode searched via the database coincides with the first communication mode, the multi-mode mobile terminal maintains the currently used first communication mode. And, the multi-mode mobile terminal keeps tracing its position.

Thereafter, the multi-mode mobile terminal looks for a more preferential communication mode in its currently traced position again. Namely, the multi-mode mobile terminal searches the database storing the setup information of the communication mode per position using its currently traced position (S45).

In doing so, the multi-mode mobile terminal compares the communication mode searched via the database, i.e., communication mode corresponding to its traced position, to the second communication mode to find out whether the former coincides with the latter (S46).

If the communication mode searched via the database fails to coincide with the second communication mode, the multi-mode mobile terminal again checks whether the timer driven at the previous communication mode triggering is expired (S47).

If the communication mode searched via the database fails to coincide with the second communication mode and the timer is expired, simultaneously, the multi-mode mobile terminal triggers the second communication mode corresponding to its current traced position (communication mode searched via database) from the currently used first communication mode (S48).

Thus, the present invention utilizes the timer so that the triggering of the communication mode fails to occur frequently. Therefore, the communication mode triggering never occurs again within the setup time of the timer having started to be driven from the time point of the previous communication mode triggering.

On the other hand, if the communication mode searched via the database coincides with the second communication mode, the multi-mode mobile terminal maintains the second communication mode and keeps tracing its position.

Figure 7:
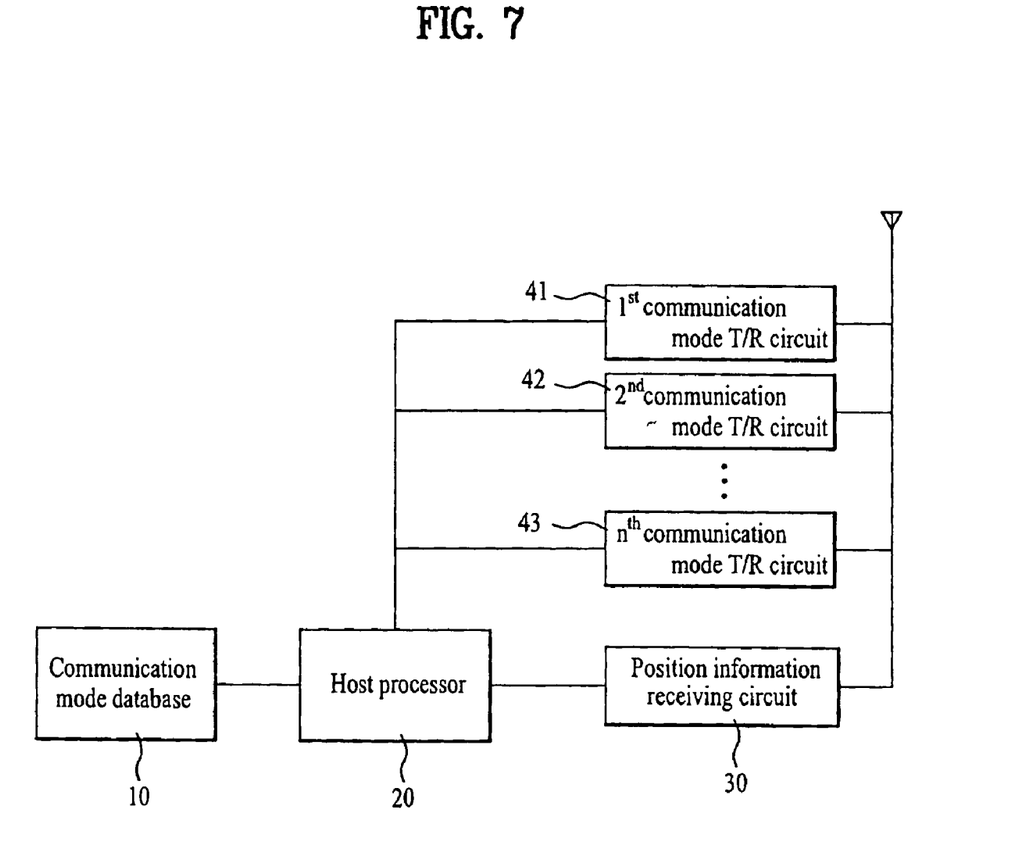
FIG. 7 is a block diagram of a multi-mode mobile terminal according to one embodiment of the present invention.

FIG. 7 is a block diagram of a multi-mode mobile terminal according to one embodiment of the present invention.

Referring to FIG. 7, a multi-mode mobile terminal according to one embodiment of the present invention is operative in various communication modes supporting various communication ways. The multi-mode mobile terminal includes a transceiver unit for transmitting and receiving signals in a plurality of communication modes. The transceiver unit may include a plurality of per-communication-mode transmitting/receiving circuits 41 to 43 operating according to the various communication modes, respectively.

The multi-mode mobile terminal includes a position information receiving circuit 30 receiving its position information from a GPS satellite.

The multi-mode mobile terminal includes a communication mode database 10 storing setup information of communication mode per position based on the description of FIG. 3A and FIG. 3B.

And, the multi-mode mobile terminal includes a host processor 20 controlling operations of the transceiver unit, for example, by controlling operations of the per-communication-mode transmitting/receiving circuits 41 to 43, based on its current position information.

An operation of triggering a communication mode of a multi-mode mobile terminal according to the above-explained construction is explained as follows.

First of all, the position information receiving circuit 30 receives the position information of the multi-mode mobile terminal from the GPS satellite and delivers the received position information to the host processor 20.

The host processor 20 searches the communication mode database 10 using the position information delivered from the position information receiving circuit 30. Namely, the host processor 20 searches the communication mode corresponding to the position information provided from the host processor 20 from the communication mode database 10.

In doing so, the host processor 20 determines whether the transceiver unit is operating in the communication mode searched from the communication mode database. This may include checking whether the transmitting/receiving circuit of the communication mode searched from the communication mode database is being driven or not.

The host processor 20 does not perform the triggering operation of the communication mode if the transceiver unit is operating in the communication mode searched from the communication mode database, for example, if the transmitting/receiving circuit of the communication mode searched from the communication mode database is being driven.

On the other hand, if the transceiver unit is not currently operating in the communication mode searched from the communication mode database, the host processor 20 causes the transceiver unit to operate in the corresponding communication mode, for example, by driving the transmitting/receiving circuit of the corresponding communication mode.

Thereafter, the host processor 20 stops driving the previously driven transmitting/receiving circuit.

For instance, if a first communication mode transmitting/receiving circuit is being driven and the communication mode searched from the communication mode database is a second communication mode, the host processor 20 drives a second communication mode transmitting/receiving circuit 42 and stops driving the first communication mode transmitting/receiving circuit 41.

Additionally, the host processor 20 of the present invention includes an internal timer so that the communication triggering is prevented from occurring frequently and does not switch to drive another transmitting/receiving circuit from the currently driven transmitting/receiving circuit within a drive time of the internal timer.

Meanwhile, the following two examples help to explain the frequency handling of the multi-mode mobile terminal.

Firstly, each of the per-communication-mode transmitting/receiving circuits 41 to 43 includes circuits for processing RF (radio frequency) and IF (intermediate frequency) signals, and the host processor 20 is responsible for processing BF (baseband frequency) signals.

Secondly, each of the per-communication-mode transmitting/receiving circuits 41 to 43 is responsible for processing RF (radio frequency), IF (intermediate frequency), and BF (baseband frequency) signals.

Meanwhile, when the multi-mode mobile terminal is located in a place where it is unable to receive the position information from the GPS satellite, the host processor 20 computes its position using parameters of signals currently received via the currently driven transmitting/receiving circuit such as strength of reception signal, time of arrival (TOA) of the reception signal, time difference of arrival between reception signals, angle of arrival (AOA) of the reception signal, and the like. And, the host processor 20 searches the communication mode database 10 using the computed position information. Namely, the host processor 20 asks a user whether to execute the triggering of communication mode to support the manual triggering method and includes applications for executing the triggering of the communication mode.

Figure 8:
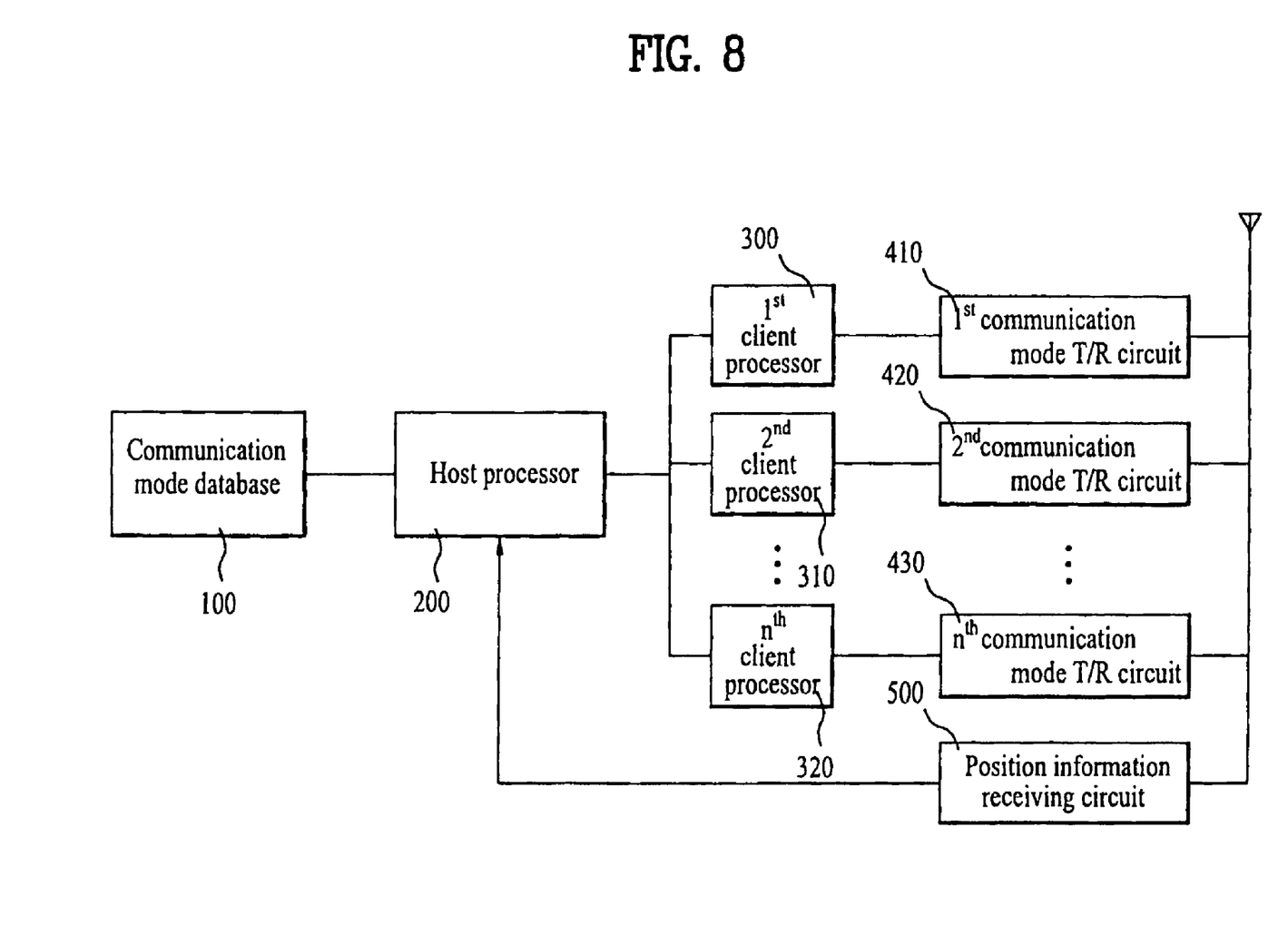
FIG. 8 is a block diagram of a multi-mode mobile terminal according to another embodiment of the present invention.

FIG. 8 is a block diagram of a multi-mode mobile terminal according to another embodiment of the present invention.

Referring to FIG. 8, a multi-mode mobile terminal according to another embodiment of the present invention is operative in various communication modes supporting various communication ways, and includes a plurality of per-communication-mode transmitting/receiving circuits 410 to 430 operating according to the various communication modes, respectively.

The multi-mode mobile terminal includes a plurality of client processors 300 to 320 controlling a plurality of the per-communication-mode transmitting/receiving circuits 410 to 430, respectively.

In this case, each of the per-communication-mode transmitting/receiving circuits 410 to 430 handles RF and IF signals and each of the per-communication-mode client processors 300 to 320 handles BF signals.

The multi-mode mobile terminal includes a position information receiving circuit 500 receiving its position information from a GPS satellite.

The multi-mode mobile terminal includes a communication mode database 100 storing setup information of communication mode per position based on the description of FIG. 3A and FIG. 3B.

And, the multi-mode mobile terminal includes a host processor 200 selecting a communication mode based on its current position information and the client processors 300 to 320 according to the selected communication mode.

An operation of triggering a communication mode of a multi-mode mobile terminal according to the above-explained construction is explained as follows.

First of all, the position information receiving circuit 500 receives the position information of the multi-mode mobile terminal from the GPS satellite and delivers the received position information to the host processor 200.

The host processor 200 searches the communication mode database 100 using the position information delivered from the position information receiving circuit 500. Namely, the host processor 200 searches the communication mode corresponding to the position information provided from the host processor 200 from the communication mode database 100.

Moreover, in case that the host processor 200 is unable to utilize the position information via the position information receiving circuit 500, i.e., in case that the multi-mode mobile terminal is located in a place where it is unable to receive the position information from the GPS satellite, the host processor 200 computes its position by being provided with parameters of signals currently received via the currently driven transmitting/receiving circuit such as strength of reception signal, time of arrival (TOA) of the reception signal, time difference of arrival between reception signals, angle of arrival (AOA) of the reception signal, and the like. And, the host processor 200 searches the communication mode database 100 using the computed position information. Namely, the host processor 200 searches the communication mode corresponding to the computed position information from the communication mode database 100 using the various parameters of the reception signals.

In doing so, the host processor 200 checks whether a transmitting/receiving path of the communication mode searched from the communication mode database 100 is in active or inactive mode.

If the transmitting/receiving path of the communication mode searched from the communication mode database 100 is in active mode, the host processor 200 does not execute the triggering of the communication mode.

On the other hand, if the transmitting/receiving path of the communication mode searched from the communication mode database 100 is in inactive mode, the host processor 200 provides a control signal to the client processor of the corresponding transmitting/receiving path to give a command of switching to the active mode. Thereafter, the host processor 200 provides the client processor of the transmitting/receiving path, which was previously in the active mode, with a control command of switching to the inactive mode.

For instance, if a current first communication mode transmitting/receiving path is in active mode and the communication mode searched from the communication mode database is a second communication mode, the host processor 200 provides the second client processor 310 with a control signal for switching a second transmitting/receiving path to active mode. The second client processor 310 then drives the second communication mode transmitting/receiving circuit 420. Simultaneously, the host processor 200 provides the first client processor 300 with a control signal for switching the first transmitting/receiving path to inactive mode. The first client processor 300 then stops driving the first communication mode transmitting/receiving circuit 410.

In addition, the host processor 200 of the present invention includes an internal timer so that the communication triggering is prevented from occurring frequently and does not switch the currently driven transmitting/receiving path to another transmitting/receiving path within a drive time of the internal timer.

Accordingly, the present invention provides a smooth communication service even if the multi-mode mobile terminal is located at a place where the reception of base station signals is poor, i.e., basement or shadow zone in a communication environment where various kinds of communications systems co-exist.

And, the present invention enables to trigger a preferential communication mode based on the current position of the multi-mode mobile terminal regardless of the reception of the base station signals, thereby enabling to provide communication services more stably to a user even if it is unable to receive the base station signals.

Moreover, the present invention drives a timer to prevent the triggering of the communication mode from occurring frequently, thereby enabling to provide communication services more stably.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling a multi-mode mobile terminal, the method comprising:
    storing a database including a plurality of position indexes indicating a geographical area and a preferable cellular communication mode corresponding to each of the position indexes, the preferable cellular communication mode being a cellular communication mode having a most superior quality in a corresponding geographical area;
    communicating with a first base station corresponding to a first cellular communication mode;
    acquiring a current position of the multi-mode mobile terminal from at least one global positioning system (GPS) satellite;
    determining a second cellular communication mode corresponding to a preferable cellular communication mode by comparing the current position of the multi-mode mobile terminal to the geographical areas identified in the database;
    determining if the second cellular communication mode is different than the first cellular communication mode;
    triggering a communication mode to switch from the first cellular communication mode to the determined second cellular communication mode when the second cellular communication mode is different than the first cellular communication mode and simultaneously starting a timer for counting an amount of time that has elapsed since the triggering of the communication mode;
    communicating with a second base station corresponding to the determined second cellular communication mode;
    acquiring the current position of the multi-mode mobile terminal from said at least one GPS satellite;
    determining a third cellular communication mode corresponding to a next preferable cellular communication mode by comparing the current position of the multi-mode mobile terminal to the geographical areas identified in the database;
    determining if the third cellular communication mode is different than the second cellular communication mode; and
    triggering a communication mode to switch from the second cellular communication mode to the determined third cellular communication mode only when the third cellular communication mode is different than the second cellular communication mode and when the amount of time counted by the timer is greater than a predetermined amount of time.

2. The method of claim 1, wherein the geographical areas include square-shaped geographical areas and the position indexes correspond to corners of the square-shaped geographical areas.

3. A multi-mode mobile terminal, comprising:
    a database configured to store a plurality of position indexes identifying a geographical area and a preferable cellular communication mode corresponding to each of the position indexes, the preferable cellular communication mode being a cellular communication mode having a most superior quality in a corresponding geographical area;
    a display configured to display information;
    a position information receiving circuit configured to determine a current position of the multi-mode mobile terminal from at least one global positioning system (GPS) satellite; and
    a host processor configured to control a first communication mode circuit to communicate with a first base station corresponding to a first cellular communication mode, to control the position information receiving circuit to acquire the current position of the multi-mode mobile terminal from said at least one GPS satellite, to determine a second cellular communication mode corresponding to a preferable cellular communication mode by comparing the current position of the multi-mode mobile terminal to the geographical areas identified in the database, to determine if the second cellular communication mode is different than the first cellular communication mode, to trigger a communication mode to switch from the first cellular communication mode to the determined second cellular communication mode when the second cellular communication mode is different than the first cellular communication mode and simultaneously start a timer for counting an amount of time that has elapsed since the triggering of the communication mode, to control a second communication mode circuit to communicate with a second base station corresponding to the determined second cellular communication mode, to control the position information receiving circuit to acquire the current position of the multi-mode mobile terminal from said at least one GPS satellite, to determine a third cellular communication mode corresponding to a next preferable cellular communication mode by comparing the current position of the multi-mode mobile terminal to the geographical areas identified in the database, to determine if the third cellular communication mode is different than the second cellular communication mode, and to trigger a communication mode to switch from the second cellular communication mode to the determined third cellular communication mode only when the third cellular communication mode is different than the second cellular communication mode and when the amount of time counted by the timer is greater than a predetermined amount of time.

4. The mobile terminal of claim 3, wherein the geographical areas include square-shaped geographical areas and the position indexes correspond to corners of the square-shaped geographical areas.

* * * * *